United States Patent [19]

Capuano

[11] 4,389,145
[45] Jun. 21, 1983

[54] METHOD OF TAPPING DUAL THREAD FASTENERS

[75] Inventor: Terry D. Capuano, Hinckley, Ohio

[73] Assignee: Russell, Burdsall & Ward Corporation, Mentor, Ohio

[21] Appl. No.: 297,777

[22] Filed: Aug. 31, 1981

[51] Int. Cl.³ .......................... B23G 1/16; B23G 5/06; B21D 53/24
[52] U.S. Cl. .................................. 408/1 R; 10/86 A; 10/141 R; 408/218
[58] Field of Search .......... 10/75, 86 R, 86 A, 141 R; 408/1, 215–222; 411/259, 307, 308, 411, 436

[56] References Cited

U.S. PATENT DOCUMENTS

| | | | |
|---|---|---|---|
| 662,064 | 11/1900 | Ehmke | 408/222 X |
| 1,210,508 | 1/1917 | Marye | 408/218 |
| 1,447,056 | 2/1923 | Bates | 411/307 |
| 1,946,860 | 2/1934 | Kielland | 411/308 |
| 2,204,754 | 6/1940 | Frame | 285/334 |
| 2,347,910 | 5/1944 | Johnson | 411/307 |
| 2,383,231 | 8/1945 | Anderton | 411/308 |
| 2,473,752 | 6/1949 | Johnson | 411/259 |
| 3,205,756 | 9/1965 | Ollis, Jr. et al. | 411/411 |
| 3,266,363 | 8/1966 | Bronson et al. | 411/436 |
| 3,405,751 | 10/1968 | Parr | 411/307 |

FOREIGN PATENT DOCUMENTS 541880 1/1932 Fed. Rep. of Germany .... 10/141 R
17482 of 1908 United Kingdom ................ 411/307

Primary Examiner—Ervin M. Combs
Attorney, Agent, or Firm—Yount & Tarolli

[57] ABSTRACT

An internally threaded fastener, such as a nut, includes a body having an axially extending opening with a side wall. A coarse internal thread convolution is formed in the side wall of the nut body. A fine thread convolution is also formed in the side wall of the nut body. The turns of the coincident coarse and fine thread convolutions are intermingled to enable them to engage a fastener having either a coarse or a fine external thread. An improved tap has a first section for forming the fine thread convolution and a second section for forming the coarse thread convolution. The two sections of the tap are interconnected in a coaxial relationship by a connector section having an axial extent which is less than the axial extent of the coincident coarse and fine thread convolutions. When a plurality of nuts are to be tapped, the fine thread convolution is tapped first. This enables a leading nut to be moved away from a following nut during tapping of a coarse thread convolution in the leading nut and the tapping of a coarse thread convolution in the following nut.

14 Claims, 4 Drawing Figures

METHOD OF TAPPING DUAL THREAD FASTENERS

BACKGROUND OF THE INVENTION

The present invention relates to a new and improved method and apparatus for tapping a fastener having thread convolutions with different pitches.

An internally threaded fastener having coincident coarse and fine pitch thread convolutions with intermingled turns was invented by Harold James Mortus. This fastener is the subject matter of U.S. patent application Ser. No. 292,238 filed Aug. 12, 1981 and entitled "Dual Thread Fastener and Method of Making the Same".

The tapping of the coarse and fine thread convolutions of the fastener disclosed in the Mortus application can be performed with a complicated and expensive special tap. This tap must be designed to simultaneously tap coincident thread convolutions of different pitches. Although a special tap is relatively expensive, the use of a single special tap facilitates controlling the starting points for the coarse and fine thread convolutions.

Rather than using a relatively expensive special tap, it is contemplated that the dual thread fastener disclosed in the above-mentioned Mortus application could be formed by sequentially tapping the fastener with a pair of taps having different pitches. For example, a first tap having a relatively fine pitch could be used to tap a fine thread convolution in the fastener and then a second tap having a relatively coarse pitch could be used to tap a relatively coarse thread in the fastener. Although the sequential use of a pair of taps avoids incurring the cost of making a special tap, when a pair of taps are used difficulty may be encountered in having a single starting point for both the coarse and fine thread convolutions. The use of a single starting point for the coarse and fine thread convolutions is advantageous in that it tends to minimize a tendency for false starts when either a coarse or fine external thread convolution is turned into the internally thread fastener. Also, the use of a single start does not significantly reduce the strength of the tapped hole and prevents cross threading.

SUMMARY OF THE PRESENT INVENTION

The present invention provides a new and improved method and apparatus for tapping coarse and fine internal thread convolutions in a fastener. The invention may be practiced by using a single tap. This improved tap has a first section for forming a thread convolution with a first pitch and a second section for forming a thread convolution with a second pitch which is different than the first pitch.

The first internal thread convolution is formed in the side wall of the body of the fastener with the first section of the tap. After the first thread convolution has been formed in the side wall of the fastener, a second internal thread convolution with a second pitch is formed with the second section of the tap. The second thread convolution is coincident with the first thread convolution. This results in the turns of the two internal thread convolutions being intermingled.

When a plurality of nuts or other fasteners are to be tapped, a relatively fine pitch thread convolution is first tapped in a nut with one section of the tap. Then a relatively coarse thread convolution is tapped in the nut with a second section of the tap. This results in a leading nut being moved away from a following nut during tapping of a relatively coarse thread convolution in the leading nut and tapping the relatively fine thread convolution in the following nut.

In order to enable the coarse and fine thread convolutions to have a desired relationship relative to each other, the section of the tap which interconnects the coarse and fine thread tapping sections has an axial extent which is slightly less than the axial extent of the thread convolutions to be tapped in the nuts. This results in a nut engaging the coarse tap section shortly before the nut becomes disengaged from the fine tap section. Since the nut has not become disengaged from the fine tap section when it makes starting engagement with the coarse tap section, the two tap sections can be located relative to each other so that an initial turn of the coarse thread convolution has a starting point which coincides with the starting point for the fine thread convolution.

Although the present invention may be associated with fasteners which are nuts, it is contemplated that the present invention could be associated with other types of fasteners. It should be understood that the terms "coarse" and "fine" have been used to distinguish between thread convolutions having greater and lesser numbers of turns per unit of axial length. Both thread convolutions may be what is considered as fine or coarse in some environments.

Accordingly, it is an object of this invention to provide a new and improved method of forming an internally threaded fastener having coarse and fine thread convolutions with intermingled turns and wherein a first section of a tap is used to form an internal thread convolution having a first pitch and, thereafter, a second section of the same tap is used to form a second thread convolution which is coincident with the first thread convolution.

Another object of this invention is to provide a new and improved apparatus for sequentially tapping a plurality of nuts having axial openings extending through the nuts and wherein a first or leading nut is moved axially away from a second or following nut during the tapping of a thread convolution having a greater pitch in the leading nut and the tapping of a thread convolution having a lesser pitch in the trailing nut.

Another object of the invention is to provide a new and improved tap for forming an internally threaded fastener having coarse and fine thread convolutions with intermingled turns and wherein the tap includes first and second sections for tapping threads with different pitches, the two sections of the tap being separated by an axial distance which is less than the axial extent of the thread convolutions formed by the two sections of the tap.

BRIEF DESCRIPTION OF THE DRAWINGS

The foregoing and other objects and features of the invention will become more apparent upon a consideration of the following description taken in conjunction with the accompanying drawings wherein.

DESCRIPTION OF ONE SPECIFIC PREFERRED EMBODIMENT OF THE INVENTION

Nut

Figure 1:
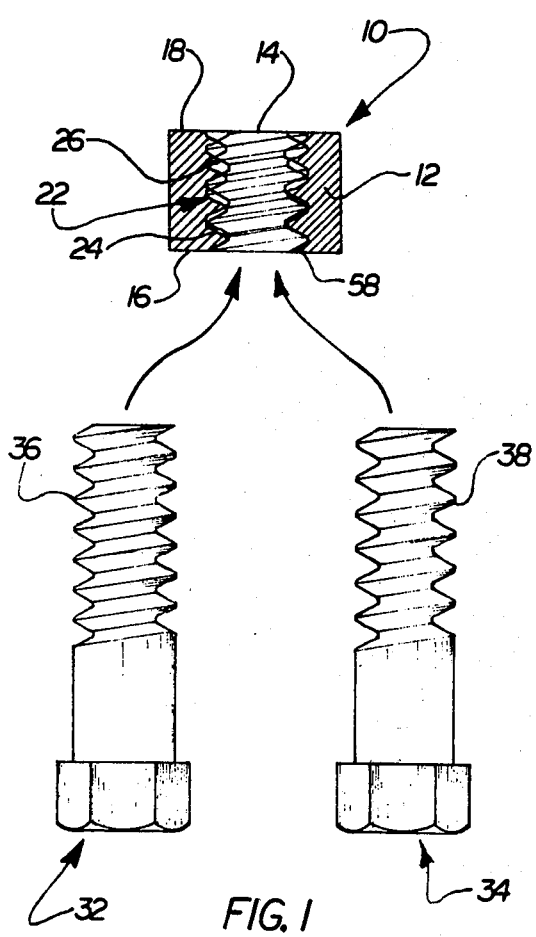
FIG. 1 is a schematic illustration depicting a nut having coarse and fine internal thread convolutions and a pair of bolts, one of the bolts having a fine external thread and the other bolt having a coarse external thread.

A dual thread nut 10 (FIG. 1) has a polygonal body 12 with a central opening 14 which extends between opposite end portions 16 and 18 of the nut body. A combined internal thread 22 is formed in the opening 14 and extends between the opposite end portions 16 and 18 of the nut. The combined thread 22 includes a fine thread convolution 24 and a coarse thread convolution 26. The axially coextensive fine and coarse thread convolutions 24 and 26 have intermingled turns to enable the nut 10 to engage either a fine or coarse external thread.

Either one of a pair of externally threaded bolts 32 and 34 can engage the nut 10. Thus, the bolt 32 has a fine external thread 36 with the same pitch as the fine internal thread convolution 24 in the nut 10. Therefore when the bolt 32 and nut 10 are turned into engagement, the fine external thread convolution 36 on the bolt 32 will engage the internal thread convolution 24. When the nut 10 and bolt 32 are being turned into engagement, the coarse internal thread convolution 26 does not interfere with the fine bolt thread 36.

Similarly, the bolt 34 has a coarse external thread 38 with the same pitch as the coarse internal thread convolution 26 in the nut 10. Therefore when the bolt 34 and nut 10 are turned into engagement, the coarse external thread 38 on the bolt 34 will fully engage the coarse internal thread convolution 26. When the nut 10 and bolt 34 are being turned into engagement, the fine internal thread convolution 24 does not interfere with the coarse bolt thread 38. The dual thread nut 10 was invented by Harold Mortus and does not, per se, form part of the present invention.

Combined Thread

The combined thread 22 is formed by the two coincident thread convolutions 24 and 26 of different pitches. The fine internal thread convolution 24 consists of a plurality of circular turns 42, indicated in double dashed lines in FIG. 2. Similarly, the coarse internal thread convolution 26 consists of a plurality of circular turns 44, indicated in single dashed lines in FIG. 2. The circular turns 44 of the coarse internal thread convolution 26 are intermingled with the circular turns 42 of the fine internal thread convolution 24.

It is contemplated that the fine and coarse internal thread convolutions 24 and 26 could have different diameters if desired. Thus one of the threads could have metric measurements while the other thread has inch measurements. However, in the illustrated embodiment of the invention they have the same diameter. Thus, the helical root 48 of the fine thread convolution 24 has the same diameter as the helical root 50 of the coarse thread convolution 26. The helical crest 52 of the fine thread convolution 24 has the same diameter as the helical crest 54 of the coarse thread convolution 26. However, it should be understood that the coarse and fine thread convolutions 24 and 26 could be formed with different crest and root diameters if desired.

Figure 2:
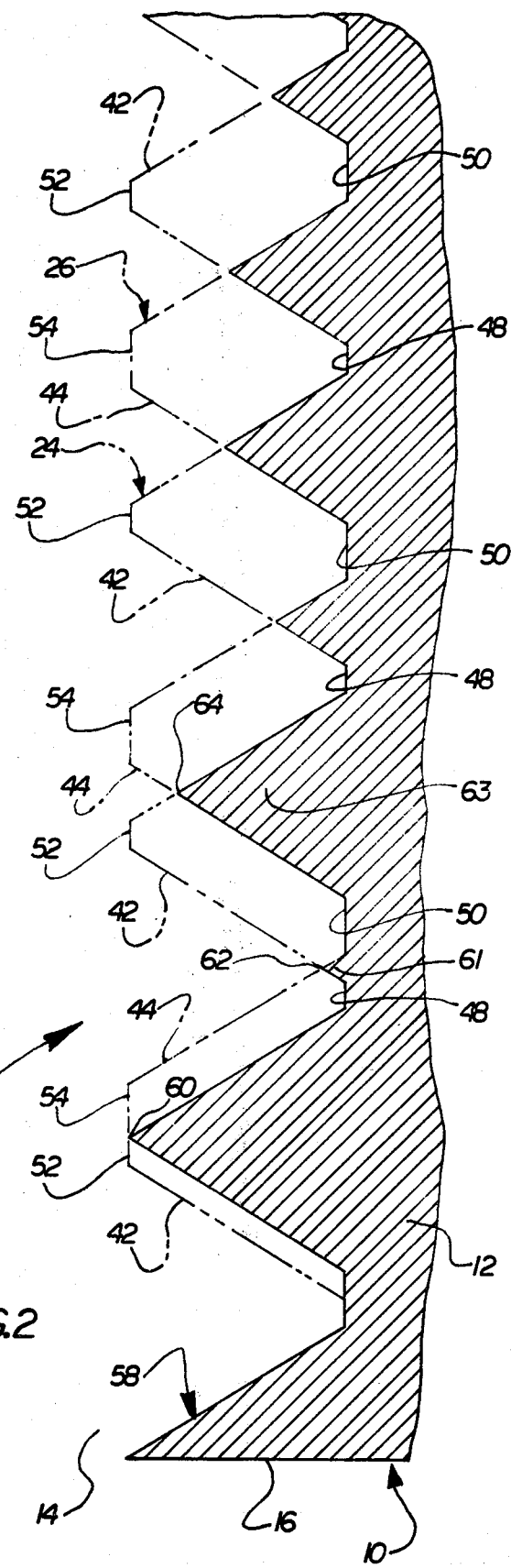
FIG. 2 is an enlarged fragmentary illustration depicting the relationship between the coarse and fine thread convolutions in the nut of FIG. 1.

In order to prevent false starts when turning the nut 10 onto the bolts 32 and 34, the fine and coarse thread convolutions 24 and 26 have a single initial or run-on turn 58 (see FIGS. 1 and 2). Thus, the fine thread convolution 36 makes initial mating engagement with the fine thread convolution 24 at the beginning of the initial or run-on thread turn 58. Similarly, the coarse thread convolution 38 of the bolt 34 makes initial mating engagement with the coarse thread convolution 26 on the nut 10 at the beginning of the initial or run-on turn 58. Therefore there is only one starting point for the two thread convolutions 24 and 26. Of course two different starting points at a specific angle apart could be provided if desired.

Although the fine and coarse thread convolutions 24 and 26 have the same major and minor diameters, they have different pitches. Thus, the distance between corresponding points on adjacent turns 42 of the fine thread convolution 24 is less than the distance between corresponding points on adjacent turns 44 of the coarse thread convolution 26. The terms "coarse" and "fine" have been used to distinguish between two threads having different pitches. The actual pitches of the thread convolutions 24 and 26 may both be relatively fine or coarse compared to other thread convolutions.

Although the different pitches of the thread convolutions 24 and 26 could be obtained in many different ways, in the illustrated embodiment, the helical flat at the root 48 (FIG. 2) of the fine thread convolution 24 is smaller than the helical flat at the root 50 of the coarse thread convolution 26. Similarly, the helical flat at the crest 52 of the fine thread convolution 24 is smaller than the helical flat at the crest 54 of the coarse thread convolution 26. In the embodiment illustrated in FIGS. 1 and 2, the fine and coarse thread convolutions 24 and 26 are symmetrical and have the same flank angles. Of course the coarse and/or fine thread convolutions could be asymmetrical if desired.

Due to the different pitches of the coincident fine and coarse thread convolutions 24 and 26, the thread convolutions move out of phase with each other (FIG. 2) after the initial turn 58. Due to the out of phase relationship of the two thread convolutions 24 and 26, the combined thread 22 has a crest diameter which varies along the axial extent of the combined thread. Thus, the combined thread 22 has a crest 60 with a diameter which is the same as the diameter of the crests 52 and 54 of the fine and coarse thread convolutions 24 and 26. However, a small crest 62 and the combined thread 22 is formed between the roots 48 and 50 of the fine and coarse thread convolutions 24 and 26 and has a large diameter crest 62.

At the next succeeding turns 42 and 44 of the fine and coarse thread convolutions 24 and 26, the flats 52 and 54 at the crests of the thread convolutions are axially offset from each other. This results in the formation of a turn 63 of the combined thread 22. The turn 63 of the combined thread 22 has a crest 64 with a diameter which is larger than the diameter of the turn 61 and smaller than the crest diameter of the fine and coarse thread convolutions 24 and 26.

Although the crest or minor diameter of the combined internal thread 22 varies along the axial extent of the combined thread, the root or major diameter of the combined thread 22 remains constant throughout its axial extent. This is because the changing phase relationship between the fine thread convolution 24 and the axially coextensive coarse thread convolution 26 does not result in the cutting away of material in such a manner as to make the root or major diameter of the combined thread 22 different than the root or major diameter of the fine and coarse thread convolutions 24 and 26. Of course, if the combined thread 22 was formed by fine and coarse thread convolutions 24 and 26 having different root or maximum diameters, the root or maximum diameter of the combined thread 22 would vary along the axial extent of the combined thread.

In the illustrated embodiment of the nut 10 the fine and coarse thread convolutions 24 and 26 have the same axial extent. Thus, both thread convolutions extend throughout the axial extent of the opening 14 (FIG. 1) in the nut body 12. Of course, the opening 14 in the nut body could be bored out so that the fine and coarse thread convolutions 24 and 26 would not extend completely through the nut. However, the coincident fine and course thread convolutions 24 and 26 would have the same axial extent in the nut body 12 and would terminate at opposite axial end portions of the nut body. This results in the fine and coarse thread convolutions 24 and 26 having intermingled turns 42 and 44. Due to the different pitches of the intermingled turns 42 and 44 of the fine and coarse thread convolutions 24 and 26, the spacing between the intermingled turns will vary along the axial extent of the combined thread 22.

Tapping the Dual Thread Nut

Figure 3:
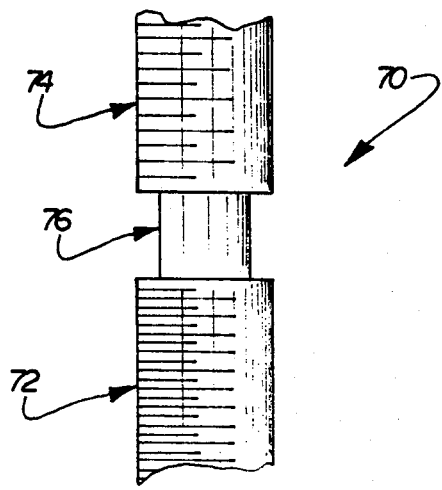
FIG. 3 is a fragmentary illustration of a tap which is constructed in accordance with the present invention to form the coarse and fine thread convolutions in the nut of FIG. 1.

In accordance with a feature of the present invention, the dual thread nut 10 is formed with fine and coarse thread convolutions 24 and 26 by using a tap 70. The tap 70 (FIG. 3) is formed as one piece and includes a first or fine tap section 72 which is connected with a second or coarse tap section 74 by a connector section 76. The fine tap section 72 is of a known construction and has axial extending flutes and lands with cutting faces which form the various turns of the fine thread convolution 24. The coarse tap section 74 is also of a known construction which is similar to the construction of the fine tap section 72. However, the cutting faces on the lands of the coarse tap section 74 are constructed so as to form the coarse thread convolution 26 in the nut body 12.

The fine and coarse tap sections 72 and 74 are fixedly interconnected by and integrally formed with the connector section 76. The connector 76 is disposed in a coaxial relationship with the fine and coarse tap sections 72 and 74. The connector section 76 has a circular cross sectional area which is smaller than the cross sectional area of the fine and coarse tap section 72 and 74.

In accordance with one of the features of the tap 70, the axial extent of the connector section 76 is slightly less than the axial extent of the fine and coarse thread convolutions 24 and 26 in the nut body 12. This enables the nut body to engage both of the tap sections 72 and 74 as the nut body moves from one of the sections to the other section. Thus when the coarse or upper section 74 (FIG. 3) of the tap 70 is used to tap the opening 14 in the nut body 12 before the fine section 72 is used to tap the opening, the nut 10 will bridge or span the space across the connector section 76 (FIG. 4) before it becomes disengaged from the coarse thread section 74.

By engaging the nut with the fine tap section 72 before the nut is disengaged from the coarse tap section 74, the starting of the tapping operation by the fine tap section 72 is in a predetermined relationship with the tapping operation which has almost been completed by the coarse tap section 74. This facilitates having both the coarse and fine thread convolutions 24 and 26 (FIG. 2) start at the same point on the initial or run-on turn 58 (FIG. 2) of the combined thread 22.

When a plurality of nuts are to be sequentially tapped with the tap 70 (FIG. 3), it is preferred to use the fine thread section 72 to tap the fine thread convolution 24 on the nut body and to subsequently use the coarse thread section 74 to tap the coarse thread convolution 26 in the nut body. This sequential order of tapping the fine and coarse thread convolutions 24 and 26 results in a first or leading nut being moved axially away from a second or trailing nut during tapping of the leading nut with the coarse thread section 74 and tapping of the trailing nut with the fine thread section 72. The manner in which this occurs is illustrated schematically in FIG. 4.

Figure 4:
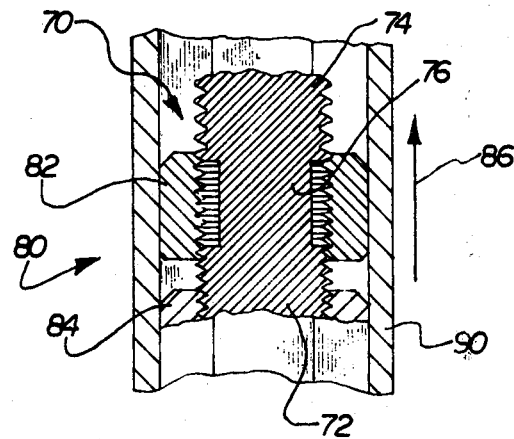
FIG. 4 is a fragmentary schematic illustration depicting the relationship between the tap of FIG. 3 and a nut upon completion of the forming of a thread convolution having a fine pitch and initiation of the forming of a thread convolution having a coarse pitch.

During a tapping operation on a series of nuts 80 having a leading nut 82 and a trailing nut 84, the nuts 82 and 84 are moved in the direction of the arrow 86 in FIG. 4. During the tapping of the leading nut 82, the fine thread section 72 of the tap 70 forms the fine thread convolution 24 in the nut 82. When the fine thread tapping operation has almost been completed, the nut 82 bridges or spans the connector section 76 of the tap 70 in the manner shown in FIG. 4.

Continued relative rotation between the tap 70 and the nut 82 results in engagement of the nut with the coarse thread section 74 and subsequent disengagement of the nut from the fine thread section 72. It should be noted that the axial extent of the connector section 76 is slightly less than the axial extent of the opening in the nut 82 so that the nut engages the coarse thread section 74 before being disengaged from the fine thread section 72.

By properly locating the initial cutting land of the coarse thread section 74 relative to the initial cutting land on the fine thread section 72, the initial cutting land on the coarse thread tapping section 74 will initially engage the nut 82 at the same point as did the initial cutting land on the fine tapping section 72 of the tap 70. Therefore, the fine and coarse thread convolutions 24 and 26 will have the same starting point at the initial turn 58 of the fine and coarse threads.

As the nut 82 moves into engagement with the coarse tapping section 74, the nut 82 is moved axially away from the next succeeding or trailing nut 84. This relative movement between the nuts 82 and 84 is due to the fact that the pitch of the fine thread tapping section 72 is less than the pitch of the coarse thread tapping section 74. Thus, each turn of relative rotation between the tap 70 and the nuts 82 and 84 results in the leading nut 84 being advanced through a distance corresponding to the lead of the fine thread convolution 24. Similarly, each turn of relative rotation between the tap 70 and the nut 82 results in the nut 82 being advanced through a distance corresponding to the lead of the coarse thread convolution 26.

Since the lead of the coarse thread convolution 26 is greater than the lead of the fine thread convolution 24, the nut 82 is advanced through a greater distance than the nut 84 upon each revolution of rotation between the nuts 82 and 84 and the tap 70. Therefore the nut 82 moves forwardly, that is in the direction of the arrow 86, at a higher speed than does the nut 84 during this portion of a tapping operation. Of course this results in an increase in the axial space between the nuts 82 and 84.

Although the tap 70 could be rotated relative to the nuts 82 and 84 to effect tapping of the nuts, it is preferred to hold the tap 70 stationary and to rotate the nuts 82 and 84 relative to the tap. This is advantageously done by engaging wrenching flats on outer side surface of the nuts 82 and 84 with a rotatable sleeve 90. The sleeve 90 has a hexagonal cross sectional configuration corresponding to the cross sectional configuration of the nut bodies 82 and 84. The sleeve 90 is rotated about the central axis of the tap 70. Therefore, rotation of the sleeve 90 rotates the nuts 82 and 84 relative to the tap 70. During each revolution of the sleeve 90, the nuts 82 and 84 advance in the direction of the arrow 86 through a distance equal to the pitch of the section of the tap engaged by the nuts. When the tapping operation is completed, the nuts 82 and 84 have the same construction as the nut 10 of FIGS. 1 and 2.

It should be understood that the sleeve 90 could be held stationary and the tap 70 rotated. In fact, with certain known tapping machines, this is preferred.

SUMMARY

In view of the foregoing it is apparent that the present invention provides a new and improved method and apparatus for tapping coarse and fine internal thread convolutions 24 and 26 in a fastener 10. The invention may be practiced by using a single tap 70. This improved tap 70 has a first section 72 for forming a thread convolution 24 with a first pitch and a second section 74 for forming a thread convolution 26 with a second pitch which is different than the first pitch.

The first internal thread convolution 24 is formed in the side wall of the body of the fastener with the first section 72 of the tap. After the first thread convolution has been formed in the sidewall of the fastener, a second internal thread convolution 26 with a second pitch is formed with the second section 74 of the tap. The second thread convolution is coincident with the first thread convolution. This results in the turns of the two internal thread convolutions being intermingled.

When a plurality of nuts or other fasteners are to be tapped, a relatively fine pitch thread convolution 24 is first tapped in a nut with one section 72 of the tap 70. Then a relatively coarse thread convolution 26 is tapped in the nut with a second section 74 of the tap 70. This results in a leading nut 82 being moved away from a following nut 84 during tapping of the relatively coarse thread convolution 26 in the leading nut 82 and tapping the relatively fine thread convolution 24 in the following nut 84.

In order to enable the coarse and fine thread convolutions 24 and 26 to have a desired relationship relative to each other, the section 76 of the tap 70 which interconnects the coarse and fine thread tapping sections 72 and 74 has an axial extent which is slightly less than the axial extent of the thread convolutions 24 and 26 to be tapped in the nuts 82 and 84. This results in a nut 82 engaging the coarse tap section 74 shortly before the nut becomes disengaged from the fine tap section 72 (see FIG. 4). Since the nut 82 has not become disengaged from the fine tap section 72 when it makes starting engagement with the coarse tap section 74, the two tap sections 72 and 74 can be located relative to each other so that an initial turn of the coarse thread convolution 26 has a starting point which coincides with the starting point of the fine thread convolution 24.

Having described specific preferred embodiments of the invention, the following is claimed:

1. A method of forming an internally threaded fastener having coincident coarse and fine thread convolutions with intermingled turns, said method comprising the steps of providing a body having an axially extending opening, providing a single tap having a first section for forming a thread convolution with a first pitch and a second section axially aligned with the first section for forming a thread convolution with a second pitch which is different than the first pitch, tapping in the side wall of the opening with the first section of the tap a first internal thread convolution having the first pitch by effecting axial movement between the tap and the body, and thereafter tapping in the side wall of the opening a second internal thread convolution of the second pitch coincident with the first thread convolution and having turns intermingled with turns of the first thread convolution, said step of tapping a second thread convolution being performed with the second section of the single tap by continuing the axial movement between the tap and the body.

2. A method as set forth in claim 1 wherein said step of tapping a second internal thread convolution includes forming an initial turn of the second thread convolution with a starting point which coincides with the starting point of the first thread convolution.

3. A method as set forth in claim 1 wherein said step of tapping a first internal thread convolution includes effecting axial movement between the tap and the body at a first rate and said step of tapping a second thread convolution includes effecting axial movement between the tap and the body at a second rate which is different than the first rate.

4. A method as set forth in claim 1 wherein said steps of effecting axial movement between the body and the tap during the tapping of the first and second internal thread convolutions includes moving the body relative to the tap.

5. A method as set forth in claim 1 wherein said steps of effecting axial movement between the body and the tap during the tapping of the first and second internal thread convolutions includes moving the tap relative to the body.

6. A method as set forth in claim 1 wherein said step of tapping a second thread convolution with a second section of the single tap is initiated while the first section of the single tap is in engagement with the first thread convolution.

7. A method as set forth in claim 1 wherein said step of tapping the first internal thread convolution includes engaging a first end portion of the body with the first section of the tap and effecting axial movement between the tap and the nut body to separate the first end portion of the body from the first section of the tap while a second end portion of the body is in engagement with the first section of the tap, said step of tapping a second internal thread convolution includes engaging the first end portion of the body with the second section of the tap while the second end portion of the body is in engagement with the first section of the tap.

8. A method as set forth in claim 7 further including the step of thereafter disengaging the second end portion of the body and the first section of the tap.

9. A method as set forth in claim 7 wherein the first and second sections of the tap are separated by a connector section having a cross sectional area which is less than the cross sectional areas of the first and second sections of the tap, said method further including the step of bridging the connector section of the tap with the body prior to the completion of said step of tapping a first thread convolution with the first section of the tap and after initiation of said step of tapping a second thread convolution with the second section of the tap.

10. A method of sequentially tapping a plurality of nut bodies having axial openings extending through the nut bodies, said method comprising the steps of providing a tap having a first section for forming a thread convolution with a first pitch and a second section for forming a thread convolution with a second pitch which is greater than the first pitch, moving a first nut body and the tap axially relative to each other at a first speed while forming a thread convolution having the first pitch in the first nut body with the first section of the tap, moving a second nut body and the tap axially relative to each other at the first speed while forming a thread convolution having the first pitch in the second nut body with the first section of the tap, and moving the first nut body axially away from the second nut body by moving the first nut body and the tap axially relative to each other at a second speed which is greater than the first speed while forming a thread convolution having the second pitch in the first nut body with the second section of the tap and while continuing to form a thread convolution having the first pitch in the second nut body with the first section of the tap.

11. A method as set forth in claim 10 further including the step of maintaining the distance between the first and second nut bodies substantially constant while forming thread convolutions having the first pitch in the first and second nut bodies with the first section of the tap and increasing the distance between the first and second nut bodies while forming a thread convolution having the second pitch in the first nut body and forming a thread convolution having the first pitch in the second nut body.

12. A method as set forth in claim 10 wherein aid step of forming a thread convolution having the second pitch in the first nut body with the second section of the tap includes forming the thread convolution with a plurality of turns which are intermingled with a plurality of turns of the thread convolution having a first pitch.

13. A method as set forth in claim 10 wherein said step of forming a thread convolution having the second pitch in the first nut body with the second section of the tap includes forming an initial turn of the thread convolution with a starting point which coincides with the starting point of the thread convolution having a first pitch.

14. A method as set forth in claim 10 wherein the first and second sections of the tap are separated by a connector section having a cross sectional area which is less than the cross sectional areas of the first and second sections of the tap, said method further including the step of bridging the connector section of the tap with the first nut body prior to completion of said step of forming a thread convolution having the first pitch in the first nut body.

* * * * *